Oct. 2, 1956    U. TUCHEL    2,765,452
ELECTRIC CONTACTS
Filed March 10, 1953    3 Sheets-Sheet 1
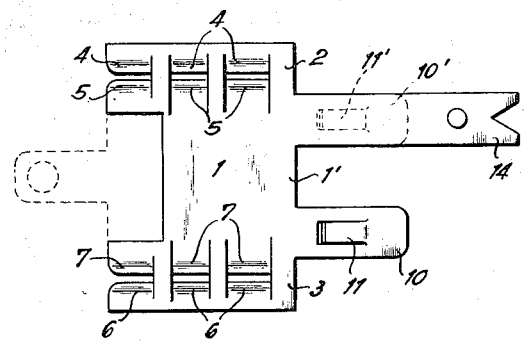
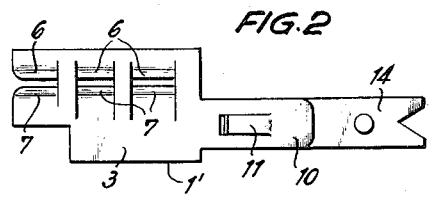
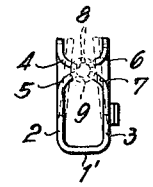
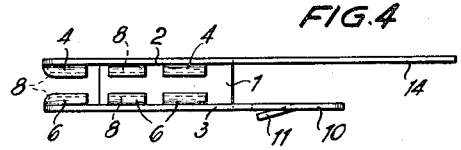
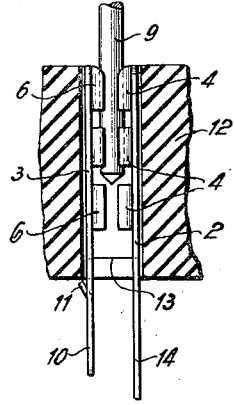
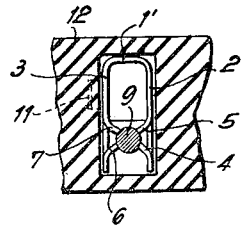
INVENTOR
ULRICH TUCHEL
By Young, Emery & Thompson
Attys.

Oct. 2, 1956 U. TUCHEL 2,765,452
ELECTRIC CONTACTS

Filed March 10, 1953 3 Sheets-Sheet 2

INVENTOR
ULRICH TUCHEL
By Young, Emery & Thompson
Attys.

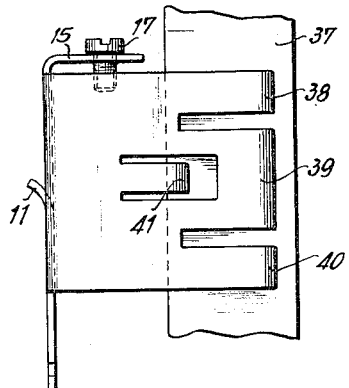
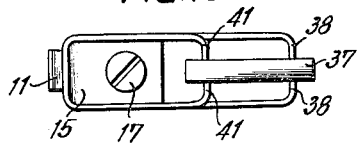
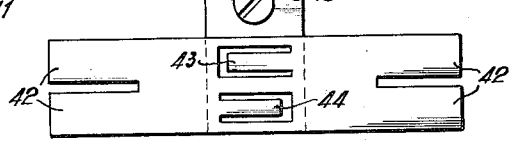
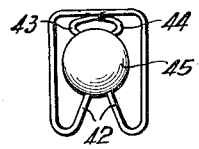
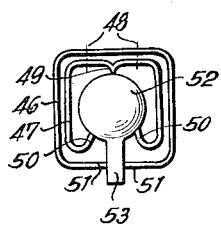
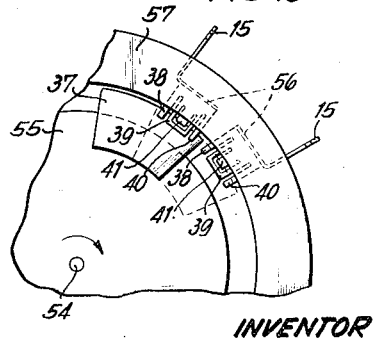

United States Patent Office 2,765,452
Patented Oct. 2, 1956

2,765,452

ELECTRIC CONTACTS

Ulrich Tuchel, Heilbronn (Neckar), Germany

Application March 10, 1953, Serial No. 341,431

Claims priority, application France March 7, 1953

8 Claims. (Cl. 339—258)

This invention relates to electrical contacts of the kind comprising a gripping member, for example of sleeve or socket form, and a gripped member, for example of plug or blade form, adapted for insertion into the gripping member.

It is an object of the present invention to provide a contact with a gripping member having bent spring tongues with an area of contact with the gripped member which is small relatively to the area and spring force of the tongues.

In one construction the contact device has a socket like gripping member and a plug like gripped member insertable therein, the gripping member having bent spring tongues the front edges of which constitute the contact surfaces, said surfaces extending in the direction of insertion of the plug like gripped member. In the contact device according to the invention it is easy to provide a large number of spring tongues arranged with their front edges pressing on the gripped member. Insertion of the latter in the gripping member automatically cleans the contacting surfaces and removes oxide and dirt.

In another construction the gripping member constitutes a pre-tensioned clamp with limbs on which are formed a plurality of pairs of bent tongues having their contact surfaces extending in the direction of insertion of the gripped member. In a further construction a plurality of spring tongues of similar curvature project from the gripping member.

A number of constructional examples embodying the invention will now be fully described and are shown on the accompanying drawings, in which:

Fig. 1 is a plan view showing a gripping member of the contact device, for clarity being shown in the flat, or developed form, before it is bent into box or socket form to co-operate with a plug forming the gripped member;

Fig. 2 is a side elevation of the gripping member of Fig. 1;

Fig. 3 is an end elevation;

Fig. 4 is a plan view corresponding to Fig. 2;

Fig. 5 is a plan view partly in section showing both members of the contact device;

Fig. 6 is a front elevation, partly in section of the structure of Fig. 5;

Figs. 14 and 15 are an elevation and plan views respectively of another constructional form;

Fig. 16 is a plan view of another constructional form of the gripping member shown in the flat or developed form;

Fig. 17 is an elevation of the gripping member of Fig. 16, in the position of use;

Fig. 18 is a plan view of a further modification, and

Fig. 19 is an elevation of a part of a rotary switch including contacts according to the invention.

Figure 7:
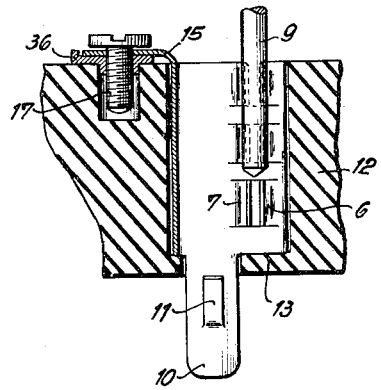
Fig. 7 is a plan view partly in section showing a second construction.

The gripping or socket member, shown in Figs. 1–4, of the contact device has substantially the form of a clamp with a base portion 1' and two limbs 2 and 3 which are pre-tensioned so that they tend to assume the position shown in broken lines in Fig. 3. The two limbs 2 and 3 each have three pairs of inbent spring tongues, 4, 5 and 6, 7 arranged one pair behind the other in the plug-in direction. The contact edges 8 of the tongues which extend substantially parallel to the plug-in direction, owing to the pre-tension of the limbs 2 and 3, press against the gripped member which is the plug 9. The base 1 has a rear extension 10 formed with an additional tongue 11 bent outwardly therefrom. The gripping member is mounted in an opening in an insulating block 12 with its inner end bearing on a shoulder 13 in said block. The tongue 11 engages the inner face of the block 13 and holds the members 1, 2 and 3 in place against the action of withdrawing the plug 9.

The embodiment shown in the flat or developed condition in Fig. 1 is for low tension current and the base 1 has a strip 14 for a soldered connection to an electrical conductor. It can be adapted for high tension current, as shown in broken lines, in which the strip 14 is replaced by a second rear extension 10' with a tongue 11' similar to the tongue 11, and there is provided a terminal lug 15 with a hole 16 therein for a terminal screw.

Figure 8:
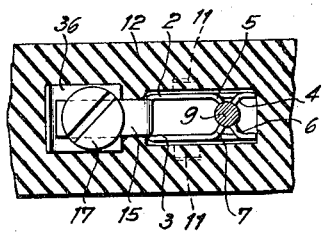
Fig. 8 is a plan view, partly in section, corresponding to Fig. 7.

The example shown in Figs. 5 and 6 is for low tension and is similar to the example for high tension shown in Figs. 7 and 8. In the example of Figs. 7 and 8 the terminal lug 15 is bent over and carries a screw 17 threaded into an underlying washer 36.

Figure 9:
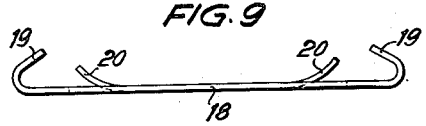
Fig. 9 is an elevation of another construction of gripping member, before bending into box form.
Figure 10:
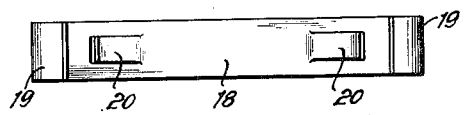
Fig. 10 is a plan view of the member of Fig. 9.
Figure 11:
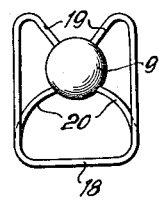
Fig. 11 is an end elevation of the gripping member of Figs. 9 and 10 in the position of use.

In the construction shown in Figs. 9–11 a metal strip 18 is used which is bent from the position shown in Figs. 9 and 10 into the position of use of Fig. 11. The strip 18 has down-bent ends 19 and up-bent tongues 20. The ends 19 and the tongues 20 have their contact edges or faces pressed against the insert plug 9.

Figure 12:
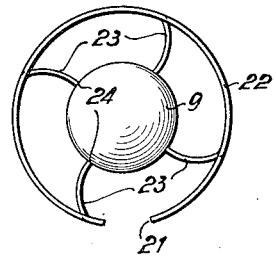
Figs. 12 and 13 are elevations of further modifications.

In the construction of Fig. 12 there is provided an open sleeve 22 having four in-bent tongues 23 of similar curvature with their contact edges bearing on the insert plug 9.

Figure 13:
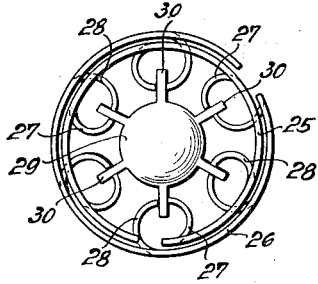

The modification shown in Fig. 13 contains two concentric sleeves 25 and 26. The sleeve 25 has inwardly bent tongues 27, the sleeve 26 has inwardly bent tongues 28, which latter tongues project through openings in the sleeve 25. The insert plug 29 in this case has six radial contact blades 30, and the contact edges of the tongues 27 press on one side of these blades, and the contact edges of the tongues 28 press on the other side of these blades. Thus each blade is held as in tongs between a pair 27 and 28 of spring tongues.

In the example of Figs. 14 and 15 the gripped member 37 is in the form of a knife, and is shown in engaged position held between tongues 38, 39, 40 and 41 which press on both sides of the knife. The tongues 38 to 40, of which the middle tongue 39 is wider than the tongues 38 and 40, are longer than the tongues 41 which are spaced from the tongues 38–40, said tongues 41 engaging the knife 37 nearer its inner edge, so that the knife cannot tilt. More spring tongues can be used, either in the direction of inserting the knife contact, or transversely thereto, than are shown in Fig. 14. The more tongues are provided in these two directions the greater the total contact surface for constant contact area of a single tongue, and the greater the current carrying capacity of the device, also the greater the mechanical force holding the members together. In the example of Figs. 16 and 17 there are four tongues 42 and two tongues 43 and 44 bent in opposing directions between which the gripped member in the form of a plug 45, is inserted.

In the modification shown in Fig. 18 the gripping member comprises two box-like elements 46 and 47 the latter inside the former and connected in any suitable manner as by solder or rivets, at 48. The inner element 47 is folded in the middle at 49 and has its free ends bent to form tongues 50. The ridge 49 formed by the fold and the tongues 50, press against a cylindrical surface of the gripped member 52, which has a plug portion and a knife portion 53, and the outer element 46 has its ends 51 formed as tongues engaging the opposite sides of the knife portion 53 which extends radially from the plug portion 52 of the gripped member.

In the construction shown in Fig. 19, a disc 55 of electrically insulating material is rotatable about an axis 54 and carries at least one contact blade 37'. This disc is enclosed in a fixed body 57 also of insulating material, carrying the gripping members 56. The members 55 and 56 constitute a rotary switch. In the position of the contact blade 37' shown in broken lines the two members 56 are short circuited. The members 56 may be on a diameter of the body 57 and two contact blades 37' may be provided also lying on a diameter of the disc 55, and connected with each other. In corresponding fashion the device can be used in other kinds of switches, for example disc and rock switches.

I claim as my invention:

1. Electric contact device comprising a socket-like gripping member, a plug like gripped member insertible into the gripping member, the gripping member having bent spring tongues formed in the internal and closed part of the gripping member and the front edges of which constitute the contact surfaces and are parallel to the length of the gripping member, said surfaces extending in the direction of insertion of the plug like gripped member, said tongues having an area of contact with the gripped member which is small relatively to the gripped member, and the tongues are composed of integral bent portions which have openings in which the tongues may bend.

2. Electric contact device according to claim 1, in which the gripping member constitutes a pre-tensioned clamp with limbs on which are formed a plurality of pairs of bent tongues having their contact surfaces extending in the direction of insertion of the gripped member, and the tongues projecting from the gripping member with similar curvature in relation to each other.

3. Electric contact device comprising a gripping member and a gripped member, said gripping member having bent spring tongues adapted to press against the surface of the gripped member, said tongues having an area of contact with the gripped member which is small relatively to the area and spring force of the tongues, the gripping member having an extension formed with a further bent out tongue for retaining the member against the force of withdrawing the gripped member.

4. An electric contact device comprising at least one gripping part and a part gripped by said gripping part with the latter comprising a plurality of sections surrounding the gripped part, a plurality of tongues for each section adapted to bear resiliently with their end faces against the gripped part and each being bent over in such a way that the end faces of the tongues lie on different generating strips of the gripped part which are parallel approximately to each other and to the direction of insertion of the gripped part.

5. An electrical contact device according to claim 4, wherein the end faces of a plurality of tongues lie one behind the other on each generating strip.

6. An electrical contact device according to claim 4, wherein the tongues of each section are bent out of incisions of its section.

7. An electrical contact device according to claim 4, wherein the tongues of the section are partly formed by bent flaps of its section and each partly bent out of incisions of its section.

8. An electrical contact device according to claim 4, wherein a plurality of at least two tongues of at least one section are bent over in opposite direction.

References Cited in the file of this patent

UNITED STATES PATENTS

| 1,369,221 | Currier | Feb. 22, 1921 |
| 2,085,707 | Shore | June 29, 1937 |
| 2,204,408 | Folsom | June 11, 1940 |
| 2,554,724 | Williams | May 29, 1951 |
| 2,594,190 | Mastney | Apr. 22, 1952 |
| 2,682,038 | Johnson | June 22, 1954 |

FOREIGN PATENTS

| 910,748 | France | Feb. 11, 1946 |
| 809,215 | Germany | July 26, 1951 |
| 810,525 | Germany | Aug. 13, 1951 |